US011016932B2

(12) United States Patent
Qiu et al.

(10) Patent No.: US 11,016,932 B2
(45) Date of Patent: May 25, 2021

(54) SYSTEMS, METHODS, AND APPARATUSES FOR SIMPLIFYING FILESYSTEM OPERATIONS UTILIZING A KEY-VALUE STORAGE SYSTEM

(71) Applicant: Alibaba Group Holding Limited, Grand Cayman (KY)

(72) Inventors: Sheng Qiu, Dublin, CA (US); Fei Liu, Burlingame, CA (US); Shu Li, Santa Clara, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 275 days.

(21) Appl. No.: 15/711,409

(22) Filed: Sep. 21, 2017

(65) Prior Publication Data

US 2019/0087431 A1 Mar. 21, 2019

(51) Int. Cl.
*G06F 16/13* (2019.01)
*G06F 16/16* (2019.01)
*G06F 16/188* (2019.01)

(52) U.S. Cl.
CPC ............ *G06F 16/13* (2019.01); *G06F 16/137* (2019.01); *G06F 16/16* (2019.01); *G06F 16/188* (2019.01)

(58) Field of Classification Search
CPC ........ G06F 16/13; G06F 16/137; G06F 16/16; G06F 16/188
See application file for complete search history.

(56) References Cited

U.S. PATENT DOCUMENTS

| | | | |
|---|---|---|---|
| 6,856,993 B1 * | 2/2005 | Verma | G06F 16/1865 |
| 8,244,712 B2 | 8/2012 | Serlet et al. | |
| 8,700,683 B2 | 4/2014 | Cooney et al. | |
| 8,904,047 B1 | 12/2014 | Kornfeld et al. | |
| 9,037,556 B2 | 5/2015 | Castellano | |
| 9,158,632 B1 | 10/2015 | Xing | |
| 2007/0130447 A1 | 6/2007 | Coon et al. | |

(Continued)

FOREIGN PATENT DOCUMENTS

| | | |
|---|---|---|
| CN | 102110146 B | 11/2012 |
| WO | 2017107414 A1 | 6/2017 |

OTHER PUBLICATIONS

Lim et al., "SILT: A memory-efficient, high-performance key-value store," In: Proceedings of the Twenty-Third ACM Symposium on Operating Systems Principles. (2011) Retrieved from <http://www.cs.cmu.edu/Web/People/dga/papers/silt-sosp2011.pdf>.

(Continued)

*Primary Examiner* — Anhtai V Tran
*Assistant Examiner* — Xiaoqin Hu
(74) *Attorney, Agent, or Firm* — James J. DeCarlo; Greenberg Traurig, LLP

(57) ABSTRACT

Systems and methods for providing key-value based filesystem operations are disclosed. In one embodiment, the method comprises receiving at least one file operation from an application, the file operation including a file path and a requested operation; generating a key-value operation based on the file operation, the key-value operation including a key including the file path; executing the key-value operation at a key-value storage engine; receiving, from the key-value storage engine, a result of the key-value operation; generating a result value based on the result of the key-value operation; and returning the result value to the application.

15 Claims, 9 Drawing Sheets

(56) References Cited

U.S. PATENT DOCUMENTS

| | | |
|---|---|---|
| 2008/0215528 A1 | 9/2008 | Sedlar |
| 2013/0103729 A1 | 4/2013 | Cooney et al. |
| 2013/0275656 A1* | 10/2013 | Talagala .............. G06F 12/0246 711/103 |
| 2014/0156618 A1* | 6/2014 | Castellano .......... G06F 16/2358 707/703 |
| 2015/0242277 A1 | 8/2015 | Cain, III et al. |
| 2015/0302111 A1* | 10/2015 | Yue ....................... G06F 16/188 707/827 |
| 2015/0379009 A1 | 12/2015 | Reddy et al. |
| 2016/0062850 A1 | 3/2016 | Xing |
| 2016/0321295 A1 | 11/2016 | Dalton |
| 2017/0039259 A1* | 2/2017 | Luo ....................... G06F 16/258 |
| 2017/0192989 A1 | 7/2017 | Georgiev et al. |
| 2017/0242867 A1* | 8/2017 | Sinha ................. G06F 12/0882 |

OTHER PUBLICATIONS

International Search Report and Written Opinion to corresponding International Application No. PCT/US2018/042337 dated Oct. 3, 2018.

International Preliminary Report on Patentability to corresponding International Application No. PCT/US2018/042337 dated Mar. 24, 2020 (11 pages).

* cited by examiner

SYSTEMS, METHODS, AND APPARATUSES FOR SIMPLIFYING FILESYSTEM OPERATIONS UTILIZING A KEY-VALUE STORAGE SYSTEM

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

The disclosed embodiments relate to filesystems and, in particular, to a key-value based filesystem.

As the volume and variety of data required by computing devices increases, numerous types of storage paradigms have proliferated to accommodate application needs. In the context of computer systems, the most common storage mechanism is the filesystem. In general, a filesystem is an organizational paradigm for managing files on a disk or partition. Examples of filesystems include ext3, ReFS, NTFS, among many others. Currently, the majority of computing devices use hierarchal filesystems wherein raw data on a storage device is organized in a hierarchal manner by a filesystem provided by an operating system.

While hierarchal filesystems may provide benefits to human users by organizing files in a tree-like manner, the hierarchal nature of these filesystems results in significant performance issues. Additionally, the hierarchal nature is unnecessary for programmatic access to a storage device (i.e., processes that are not based on human interaction). Some systems have been created to address this issue by attempting to "layer" different paradigms on top of a hierarchal filesystems to provide simpler, key-value based access.

Despite these attempts, current layered filesystems have major performance issues in handling even basic key-value based operations. These performance issues generally arise due to the requirement of a two-layer mapping between keys and underlying files.

Generally, existing systems employ a first mapping layer to map a given key to a file and a second mapping layer to map a value to a specific file in the filesystem. Thus, an intermediate value is required in order to translate a key to the contents of a file. For example, existing solutions generally utilizes a hash to create a unique key for a file or directory. This hash is mapped to a file name which is, in turn, mapped to a specific file. Thus, current systems double the amount of processing to handle all key-value based operations. Additionally, current filesystems generally have performance issues when performing searching operations due to the tree-based structure of hierarchal filesystems. That is, tree traversal requirements necessarily increase the operating complexity of any search and sorting operations.

Thus, current filesystems that attempt to utilize key-value based operations suffer numerous technical performance issues when implementing common operations that result in slow or unusable solutions.

BRIEF SUMMARY

In order to remedy these deficiencies, systems, devices, and methods are disclosed herein that utilize a key-value storage engine to optimize and thus improve key-value based operations on an underlying filesystem. Additionally, the systems, devices, and methods disclosed herein describe new filesystem operations previously not provided by existing filesystems. The disclosed embodiments specifically provide improved transactional file operations, batch file operations, and search operations using a robust query system. The disclosed embodiments provide improved functionality on top of existing hierarchal filesystems and thus may be applied to existing applications and filesystems while maintaining backwards compatibility with traditional filesystem operations, a significant advantage for improving the operation and efficiency of legacy systems.

In one embodiment, a method comprises receiving at least one file operation from an application, the file operation including a file path and a requested operation; generating a key-value operation based on the file operation, the key-value operation including a key including the file path; executing the key-value operation at a key-value storage engine; receiving, from the key-value storage engine, a result of the key-value operation; generating a result value based on the result of the key-value operation; and returning the result value to the application.

In another embodiment, a device is disclosed comprising a processor; and a non-transitory memory storing computer-executable instructions therein that, when executed by the processor, cause the device to: receive at least one file operation from an application, the file operation including a file path and a requested operation; generate a key-value operation based on the file operation, the key-value operation including a key including the file path; execute the key-value operation at a key-value storage engine; receive, from the key-value storage engine, a result of the key-value operation; generate a result value based on the result of the key-value operation; and return the result value to the application.

In another embodiment, a system is disclosed comprising: one or more applications executing on a processor; a storage device storing a plurality of files; a key-value storage engine configured to store a plurality of keys with associated values, the keys corresponding to file paths representing the plurality of files; and a key-value filesystem module configured to: receive at least one file operation from an application, the file operation including a file path and a requested operation; generate a key-value operation based on the file operation, the key-value operation including a key including the file path; execute the key-value operation at a key-value storage engine; receive, from the key-value storage engine, a result of the key-value operation; generate a result value based on the result of the key-value operation; and return the result value to the application.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale and non-limiting, emphasis instead being placed upon illustrating principles of the disclosure, which are further recited in the appended claims.

DETAILED DESCRIPTION

Figure 1:
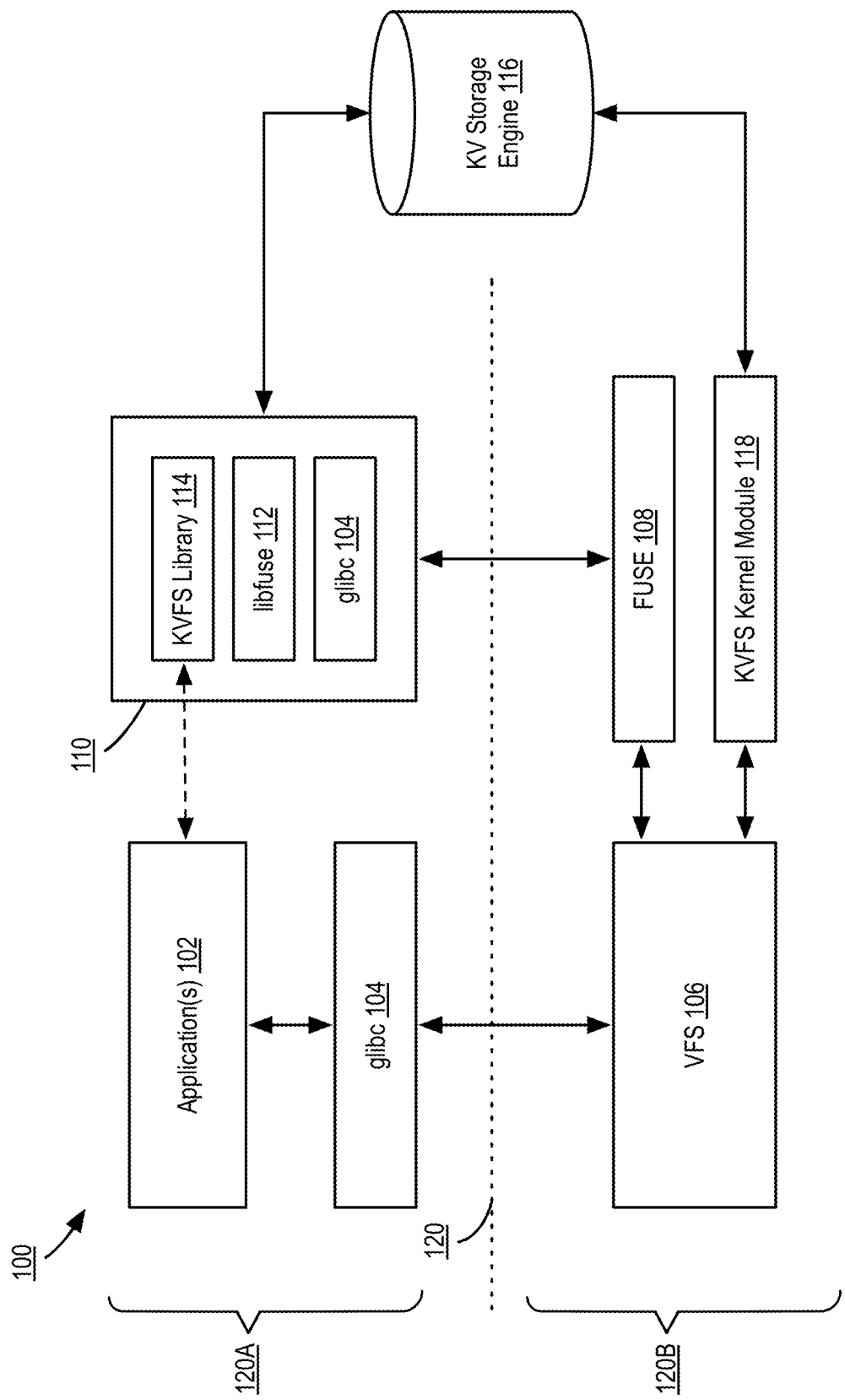
FIG. 1 is a logical diagram illustrating a computing system for providing a key-value filesystem according to some embodiments of the disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

FIG. 1 is a logical diagram illustrating a computing system for providing a key-value filesystem according to some embodiments of the disclosure.

FIG. 1 illustrates a computing system 100 such as desktop device, server device, laptop device, mobile device, tablet, or any computing device that utilizes a storage device (remote or local) managed by a filesystem. Notably, FIG. 1 illustrates the functional components of a computing system 100, and details regarding embodiments of types of hardware utilized by the system 100 are described more fully in connection with FIG. 8, the disclosure of which is incorporated herein by reference in its entirety.

System 100 is organized into user space 120A and kernel space 120B. This division is illustrated by user-kernel boundary 120. In general, kernel space 120B software refers to privileged software (e.g., an operating system and similar software) that has full, or substantially full, access to the underlying hardware of the device. In contrast, user space 120A software refers to software and applications that do not have direct access to the underlying hardware of system 100 and must access any hardware via system calls or similar mechanisms provided by the operating system. The division between user space 120A software and kernel space 120B software is dependent on the type of operating system employed by device (e.g., in microkernel architectures).

System 100 executes one or more applications 102 in user space 120A. Applications 102 include any applications or processes executing on the system 100 including compiled software, interpreted software, applications, libraries, or other executable or linkable code. In one embodiment, applications 102 can include system-level tools such as tools provided by a shell (e.g., standard UNIX commands such as ls, cp, rm, etc.). Alternatively, or in conjunction with the foregoing, applications 102 can include full-fledged domain-specific applications or any executable program operating in user space 120A. For domain-specific applications 102, these applications 102 may utilize a key-value filesystem API (described herein) to perform non-POSIX operations on the underlying filesystem (also described herein). In contrast, standard tools may only perform POSIX-compliant operations. In general, the applications 102 comprise any application that interacts with a filesystem of the system 100.

Applications 102 communicate with the underlying hardware via system calls. In the illustrated embodiment, the system calls are provided by glibc 104. In the illustrated embodiment, glibc 104 provides necessary POSIX system calls as well as various other system calls allowing applications 102 to communicate with the operating system and underlying hardware. Although illustrated as glibc, other system call libraries may be utilized depending on the underlying operating system of the system 100.

System 100 further includes a virtual filesystem (VFS) 106. VFS 106 is an abstraction layer above a concrete or physical filesystem. In the illustrated embodiment, VFS 106 acts an intermediary between applications 102 and the underlying filesystems, transforming system calls to the appropriate filesystem calls based on the filesystem being accessed. In the illustrated embodiment, VFS 106 provides a standardized interface to allow for the use of multiple filesystems (including a key-value filesystem) simultaneously. In the illustrated embodiment, VFS 106 receives systems calls from glibc 104 and routes the system calls to the appropriate filesystem, as described herein. In general, VFS 106 provides a common interface for all filesystem operations regardless of the underlying filesystem utilized by the storage medium.

As illustrated in FIG. 1, VFS 106 provides at least two execution paths. First, VFS 108 can transmit system calls to an installed kernel module (e.g., KVFS kernel module 118). In operation, system 100 may include many kernel modules for various filesystems (e.g., ext4, ZFS, etc.) that are installed in kernel space 120B. In operation, VFS 106 determines the type of filesystem being accessed by applications 102 and if a kernel module exists routes the request to the appropriate kernel module. Details of the KFVS kernel module 118 are described in more detail herein.

Second, VFS 106 routes system calls to FUSE 108. In the illustrated embodiment, FUSE 108 is a kernel-level module for allowing access to user space 120A filesystems without modifying the kernel. That is, FUSE 108 allows for user-installed filesystems co-existing with kernel-level filesystems. Examples of user space filesystems include sshfs, MooseFS, and others. In general, user space filesystems may be mounted by executing an application that registers the user space filesystem with FUSE 108. On subsequent system calls, VFS 106 routes any system calls to a user space filesystem to FUSE 108. FUSE-based file operations are routed by FUSE 108 to a corresponding FUSE library in user space 120A, such as KVFS library 114. A FUSE library generally defines a number of endpoints conforming to a standardized interface that FUSE 108 understands. In some embodiments, the library may additionally include supplemental interfaces that may be called directly from an application.

In the illustrated embodiment, the installed filesystems of system 100 includes a key-value filesystem (KVFS) implemented as a user space module 110 and/or a kernel space module 118. As used herein, KVFS user space module 110 and KVFS kernel module 118 are referred to, collectively, as a key-value filesystem (KVFS) module when refer to operations performed by both modules.

The system 100 may include either the KVFS user space module 110 or the module 118, or may include both depending on the specific installation of the KFVS. Both KVFS user space module 110 and module 118 communicate with an underlying key-value (KV) storage engine 116 as described herein. The user space and a kernel space implementation differ in the specific processing, both of which are described herein, yet generally perform the same operations. That is, the routing of requests to module 110 and module 118 is performed differently but the operations performed by each are substantially similar.

The KVFS user space module 110 includes a KVFS library 114, libfuse library 112, and glibc library 104. The glibc library 104 corresponds to the glibc library described previously, the disclosure of which is incorporated herein by reference in its entirety. Generally, the glibc library 104 allows for access to the underlying operating system and hardware via various system calls. Although illustrated as glibc, any system call library may be used that provides programmatic access to an underlying operating system. Similar to glibc library 104, KVFS user space module 110 further includes a libfuse library 112. The libfuse library 112 includes various calls specific to FUSE 108. For instance, the libfuse library 112 defines an application programming interface (API) that must be implemented by a FUSE-compliant filesystem. Although illustrated as libfuse, any user space filesystem library may be used. In general, any software allowing for the creation of a user space filesystems may be used in place of libfuse.

KVFS library 114 comprises the KVFS-specific application code that implements the KVFS user space module 110. In general, KFVS library 114 comprises one or more of a compiled executable (e.g., for mounting the KFVS) and an API for programmatically accessing key-value storage engine 116. The API may allow for the implementation of non-POSIX compliant commands which may be executed by applications 102 that include header files provided by the KVFS library 114.

As a first example, an application 102 may include program code for writing a file. The application 102 may issue, as part of writing a file, a "write" system call that includes a file descriptor, a buffer of data, and a count of bytes to write from the buffer to the file identified by the file descriptor. As discussed, this system call is provided by glibc 104 which forwards the call to VFS 106. VFS 106 analyzes the filesystem that corresponds to the file descriptor and identifies, for example, that the underlying filesystem is KVFS user space module 110. VFS 106 then transmits the system call to FUSE 108, which in turn forwards the call to KVFS library 114 (via glibc 104 and libfuse 112, as discussed previously). Upon receiving the call (which may include additional detail added by the preceding components), the KVFS library 114 converts the system call into a command, or set of commands, to execute on key-value storage engine 116. In some embodiments, the KVFS library 114 may also issue a system call to write a file to a hierarchal filesystem storing files on a storage device (not illustrated) via a return system call to glibc 104.

In one embodiment, KVFS library 114 may then convert the file descriptor or file name into a corresponding key in key-value storage engine 116. KVFS library 114 may then execute a PUT command provided by key-value storage engine 116 to store the buffer (or a portion thereof) as the value of the identified key in key-value storage engine 116. After successfully completing the operation, KVFS library 114 may return a value to the application 102 via libfuse 112, glibc 104, FUSE 108, and VFS 106. Continuing the write example, KVFS library 114 may return the number of bytes written (or zero if no bytes were written) via an API provided by libfuse library 112. The libfuse library 112 may then transmit the return value to FUSE 108 and VFS 104 via glibc 104.

Finally, the return value is transmitted to the calling application via a return value of the system call provided by glibc 104. Thus, from the perspective of applications 102, the system call to write, and the return value, appear as a standard interface (e.g., identical to a system call to another installed operating system), while the underlying mechanics of storing the write buffer differ significantly from, for example, writing a file to a hierarchal filesystem. Additionally, since the KVFS library 114 writes the file to disk, the filesystem may be mounted or otherwise be made functional as a normal hierarchal filesystem. Thus, the system allows for any existing filesystem to be utilized with the KVFS-base filesystem. Further discussion of a write operation is provided in connection with FIG. 4, the disclosure of which is incorporated herein by reference in its entirety.

As a second example, applications 102 may execute operations by utilizing an API provided by KVFS library 114. In this example, KVFS library 114 provides an API that allows for standard file operations (e.g., POSIX operations) as well as specialized operations (e.g., transactional operations, multi-read operations, etc.). In general, the KVFS library 114 may provide one or more header files allowing the applications 102 to include the KVFS API in the applications 102 during compilation (or during interpretation or execution). Thus, the application 102 may call one or more functions provided by the KVFS library 114, which in turn translates the API calls into operations to execute on key-value storage engine 116. Examples of such calls are provided in connection with FIGS. 4-7, the disclosure of which is incorporated herein by reference in its entirety.

Alternatively, or in conjunction with the foregoing, the KVFS may be implemented in kernel space, that is, as part of the underlying operating system. In some embodiments, KVFS kernel module 118 may be installed as a kernel module or may be compiled directly into the operating system. In a kernel-based implementation, the issuing of system calls proceeds from applications 102 to VFS 106 in the same manner as described with respect to the user space implementation.

Notably, however, since KVFS kernel module 118 is installed as a kernel space module, VFS 106 forwards the system call to KVFS kernel module 118, bypassing FUSE 108. In one embodiment, KVFS kernel module 118 provides an interface conforming to a standard interface recognizable by VFS 106. Once the call reaches KVFS kernel module 118, KVFS kernel module 118 may perform operations similar to that described with respect to KVFS library 114. That is, KVFS kernel module 118 may translate the system calls into one or more commands to be issued to key-value storage engine 116 and may additionally execute commands directly on an underlying hierarchal filesystem. Finally, KVFS kernel module 118 also returns the return value of any operations to VFS 106 and, ultimately, to applications 102 in the manner described with respect to the user space implementation.

As an example, where the KVFS may be installed as kernel space software via KVFS kernel module 118, applications 102 issue system calls to VFS 106 (via glibc 104) as described in the initial example, the disclosure of which is incorporated herein by reference in its entirety. Notably, however, since the KVFS is installed in kernel space, VFS forwards the system calls to KVFS kernel module 118 rather than to FUSE 108. In the illustrated embodiment, KVFS kernel module 118 may perform the same operations to translate the system calls to key-value storage engine 116 commands as described in connection with KVFS library 114, the disclosure of which is incorporated herein by reference in its entirety.

As discussed above, the KVFS translates standard and custom file-based commands to key-value operations performed on key-value storage engine 116. In one embodiment, key-value storage engine 116 comprises a key-value based database or storage engine. That is, the key-value storage engine 116 may comprise a software-based application or module. For example, the key-value storage engine 116 may comprise a ROCKSDB, MEMCACHED, REDIS, or other type of software database/storage engine. In some embodiments, the key-value storage engine 116 is a local application (i.e., an application running on system 100). However, in other embodiments, key-value storage engine 116 may comprise a remote or distributed key-value database. Finally, in some embodiments, key-value storage engine 116 may comprise a hardware device providing key-value based storage operations. In this embodiment, the key-value storage engine 116 comprises a hardware storage or processing device that can natively execute key-value instructions. For example, the key-value storage engine 116 may comprise an ASIC or a key-value solid state hard drive (SSD).

In each of the embodiments described above, the system 100 may perform system calls on the underlying filesystem via the KVFS library 114 and/or KVFS kernel module 118. Specifically, in one embodiment, the use of a KVFS may be accomplished using an underlying filesystem (e.g., a hierarchal filesystem) in conjunction with key-value storage engine 116. That is, an existing hierarchal filesystem may be mounted as a KVFS and operations may proceed in parallel, affecting both the underlying hierarchal filesystem and recording transactions and data within key-value storage engine 116 as discussed in more detail with respect to specific operations.

While the foregoing description focuses primarily on UNIX-based components (e.g., glibc, libfuse, etc.), the foregoing system 100 may be applied in any operating system having similar components and the disclosure is not intended to be limited only to UNIX-based devices. For example, instead of VFS, the device may use an Installable File System on WINDOWS-based platforms. Similarly, WINFSP may be used on WINDOWS in place of libfuse. Other changes to components may be made as needed based on the underlying operating system.

Figure 2A:
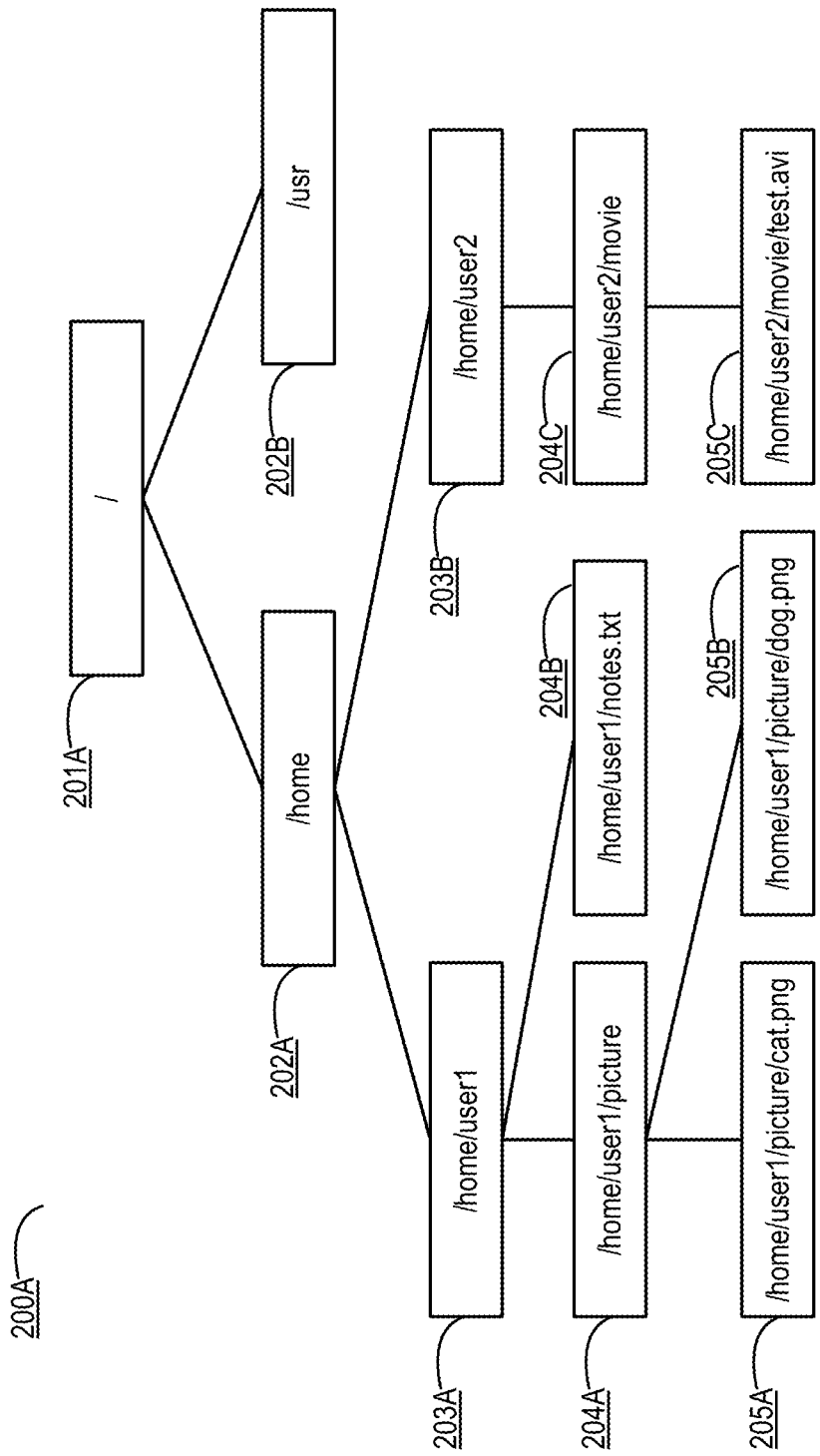
FIG. 2A is a diagram of a hierarchal filesystem according to some embodiments of the disclosure.

FIG. 2A is a diagram of a hierarchal filesystem according to some embodiments of the disclosure.

As illustrated, the filesystem 200A includes a root note 201A located at the "top" of the filesystem 200A. In the illustrated embodiment, root note 201A is stored as a directory. Root note 201A may have multiple subdirectories including home directory 202A and user directory 202B. Home directory 202A may further include subdirectories 203A and 203B. As illustrated, subdirectory 203A includes a file 204B as well as another subdirectory 204A which, in turn, includes files 205A and 205B. Similarly directory 203B includes a subdirectory 204C which, in turn, includes a file 205C. In order to perform operations on the hierarchy, significant resources must be spent in maintaining locations of files within the hierarchy and translating "paths" to files to specific locations on disk. Additionally, significant overhead must be employed to organize files in order to perform operations.

Figure 2B:
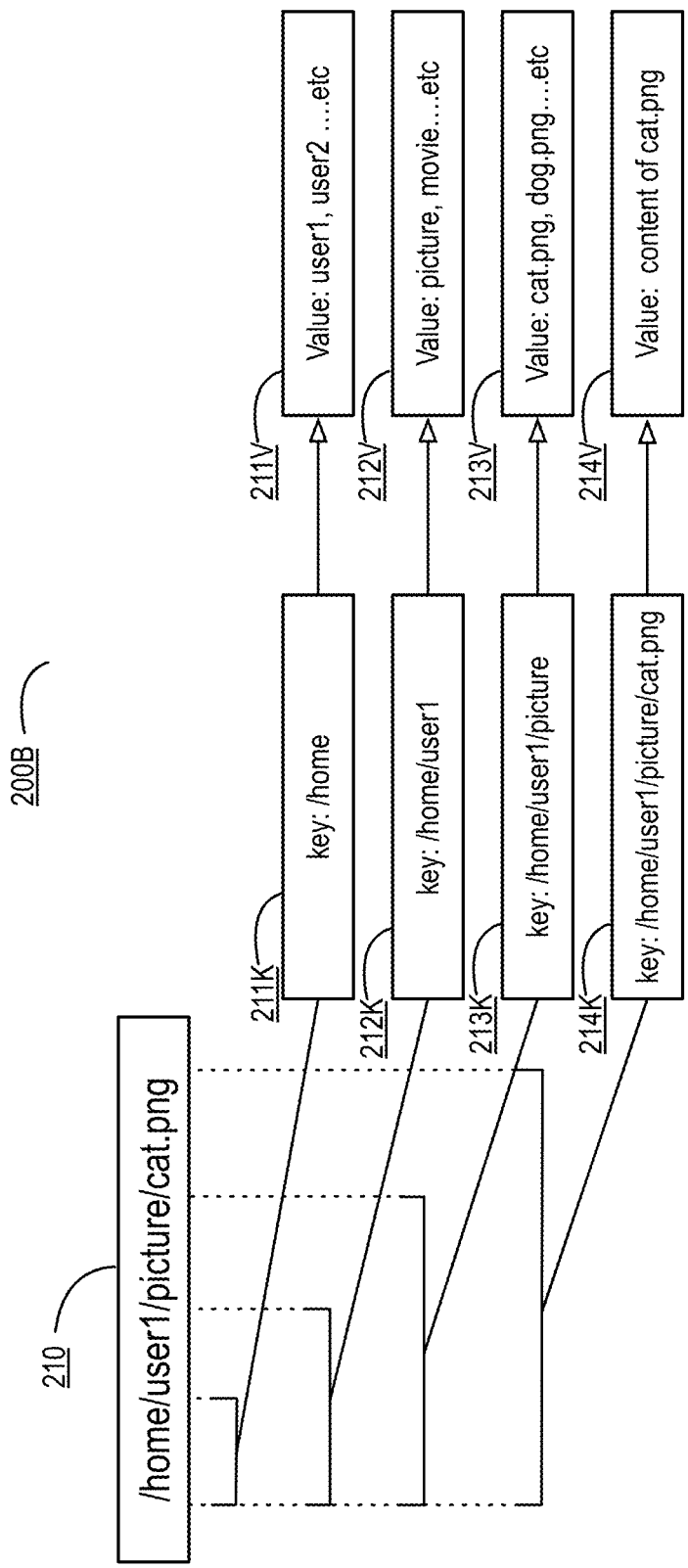
FIG. 2B is a diagram of a key-value representation of a hierarchal filesystem according to some embodiments of the disclosure.

FIG. 2B is a diagram of a key-value representation of a hierarchal filesystem according to some embodiments of the disclosure.

The filesystem 200B in FIG. 2B illustrates the mapping of traditional file path strings to a key-value namespace. As described above, POSIX system calls require the use of file paths for performing basic file operations. For example, the "open( )" system call requires a path name to identify a file descriptor that can be used for subsequent file operations. In order to provide an underlying key-value-based solution, the filesystem 200B illustrates how file paths are mapped to specific keys included within the key-value store.

As illustrated, each part of a file path (e.g., directories and a filename) is mapped to a specific key. Thus, the portion "/home" is mapped to key 211K, "/home/user1" is mapped to key 212K, "/home/user1/picture" is mapped to key 213K, and the full file path ("/home/user1/picture/cat.png") is mapped to key 214K. As can be seen, each portion of the file path is mapped to a separate key in the key-value storage engine.

As further illustrated, the value associated with each of the keys 211K, 212K, 213K, and 214K varies depending on the value of the key. For keys 211K, 212K, and 213K (directory keys), the values (211V, 212V, 213V) stored are a listing of files "stored" in that directory. In one embodiment, the values 211V, 212V, 213V may be used to traverse a simulated directory hierarchy. In some embodiments, the values may include additional information (e.g., file/directory metadata) associated with each of the underlying file path components). Notably, for key 214K, the value 214V corresponds to the contents of the file "/home/user1/picture/cat.png".

In some embodiments, the contents of a file may be stored as a binary large object block (BLOB) or similar data structure. Alternatively, or in conjunction with the foregoing, the contents may be stored as a pointer to a remote data source storing the file or a local data source storing the file. A pointer may be utilized if/when the underlying file contents exceed the maximum value size of the underlying key-value storage engine. In some embodiments, the value may be another key in the storage engine. For example, the system may represent a symbolic links as a value corresponding to the pointed to file path.

Additionally, each key or value may further include various metadata fields (not illustrated). For example, each file in keys 211V, 212V, 213V may also include various metadata regarding the file including file attributes such as size, owner, etc. as well as access permissions etc. In some embodiments, these attributes may be indexed by the underlying key-value system allowing for rapid searching and sorting based on the attribute. For example, in one implementation, the values of, for example, 211V may be stored as an Array of Hash objects wherein the values of the Hash object are indexed by the key-value storage engine.

Figure 3:
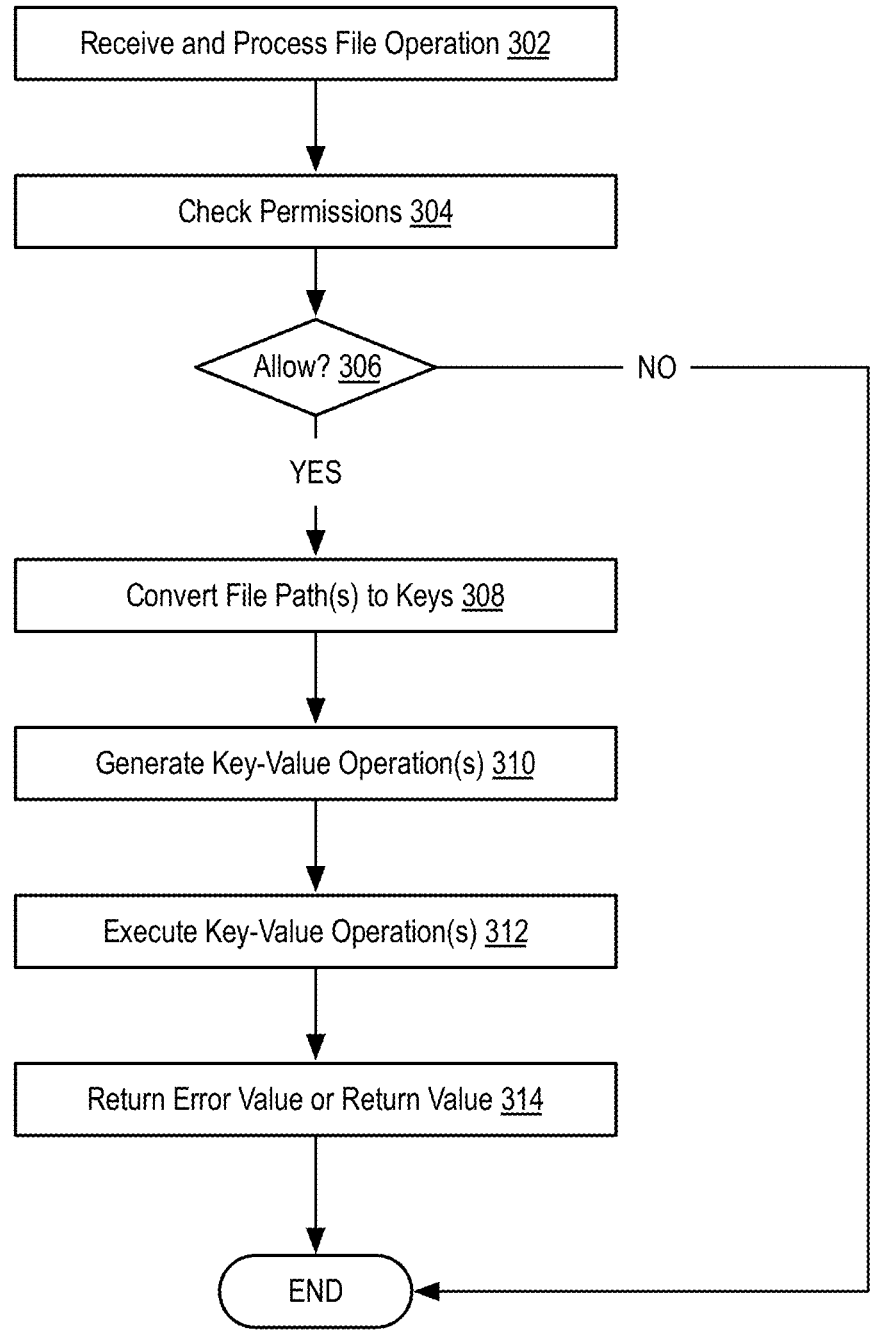
FIG. 3 is a flow diagram illustrating a method for performing operations on a key-value filesystem according to some embodiments of the disclosure.

FIG. 3 is a flow diagram illustrating a method for performing operations on a key-value filesystem according to some embodiments of the disclosure.

The methods discussed in connection with FIG. 3 are directed toward generalized file operations involving a key-value filesystem. Details regarding specific operations are provided in more detail with respect to FIGS. 4 through 7. As discussed in more detail in connection with FIG. 1, the methods disclosed in FIGS. 3 through 7 can be performed by a key-value filesystem library in user space. Alternatively, or in conjunction with the foregoing, the methods can be performed by a KVFS kernel module. With respect to FIG. 3, the method may be performed as part of implementing a POSIX-compliant set of file operations or by any operations provided by an API, as discussed in more detail in connection with FIG. 1.

In step 302, the method receives and processes a file operation.

In one embodiment, a file operation comprises a system call to access or otherwise retrieve information regarding a file identified by a file path. In some embodiments, the file may correspond to a file existing on a hierarchal filesystem. Alternatively, or in conjunction with the foregoing, the file may correspond to a file stored solely within a key-value database.

File operations may be received via a virtual filesystem and, in some embodiments, via a FUSE-based filesystem. Alternatively, file operations may be received via calls to an API, the calls being made by applications using a KVFS.

In one embodiment, a file operation comprises an operation selected from the group consisting of create, read, write, mread, mwrite, create and delete, and patch operations.

In the illustrated embodiment, the method processes the file operation (system call). In one embodiment, processing the file operation comprises executing a system call to modify or access an underlying filesystem (e.g., a hierarchal filesystem). For example, in simple examples, the method may receive a write system call and may simply execute the same write system call. However, in more complicated examples, the method may receive multiple system calls and may reorder the system calls before executing them (as discussed herein). Further, in some embodiments the method may selectively execute some of the received file operations. Finally, in some embodiments the file operations may not correspond to system calls (e.g., in the case where an application directly calls an API of the key-value file system) and the system may not execute any system calls corresponding to file operations.

In step 304, the method checks permissions associated with the file(s).

A file operation received in step 302 is issued by a "user." A user refers to an operating system user (e.g., a human user, a daemon, etc.) and generally refers to entity owner of a process that issues a file operation. In general, every file stored within a filesystem is associated with a set of permissions (e.g., user-level, group-level, and global permissions). Permissions may include the ability to read, write, or execute a file. Thus, in step 304, the method identifies the user (i.e., owner of process) executing the file operation and compares the user to a list of file permissions associated with the given file. In some embodiments, the method may use the underlying file system to identify permissions. However, in other embodiments, the method may use the key-value storage engine to retrieve stored permissions (as discussed previously).

Figure 5:
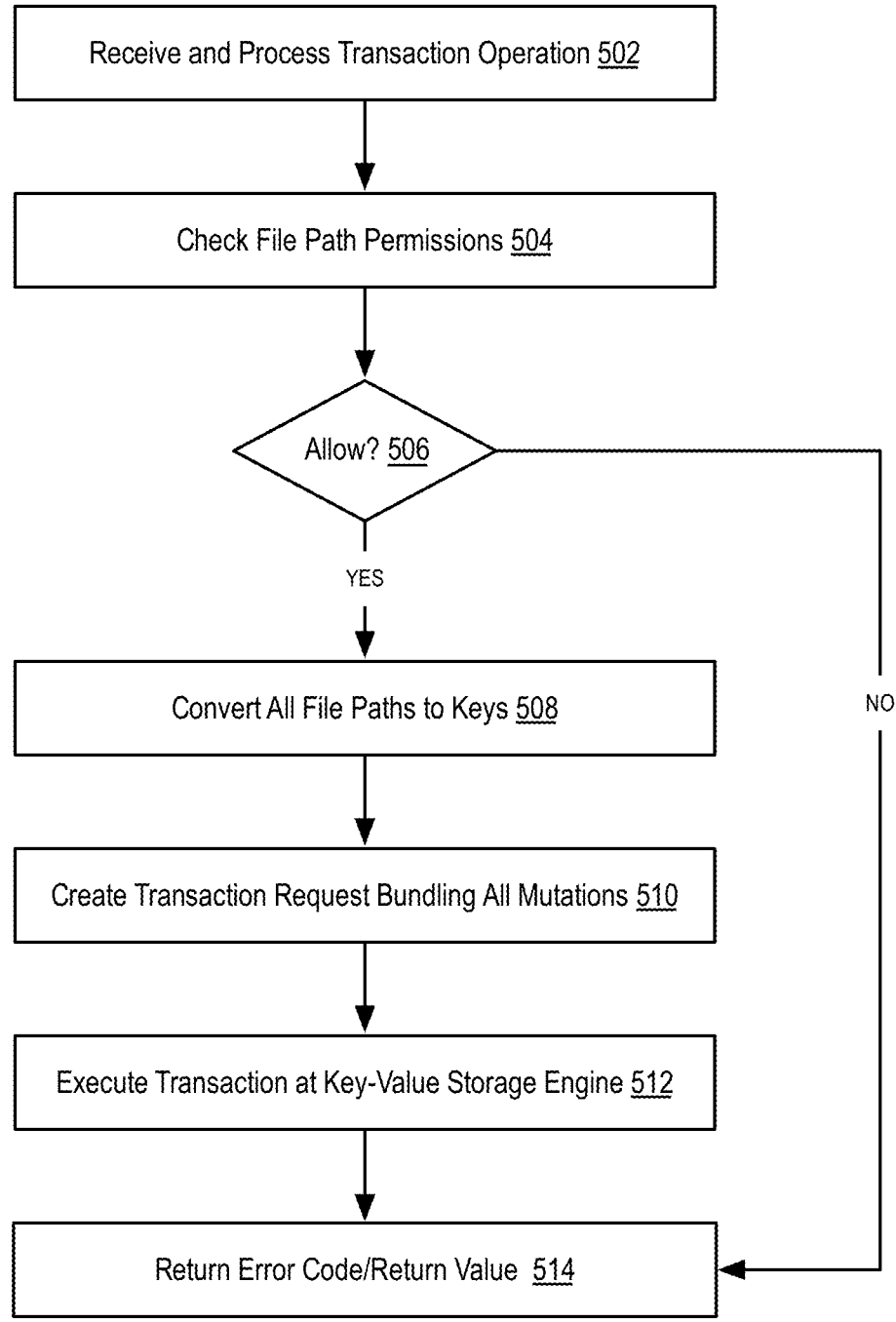
FIG. 5 is a flow diagram illustrating a method for performing a transactional operation on a key-value filesystem according to some embodiments of the disclosure.
Figure 6:
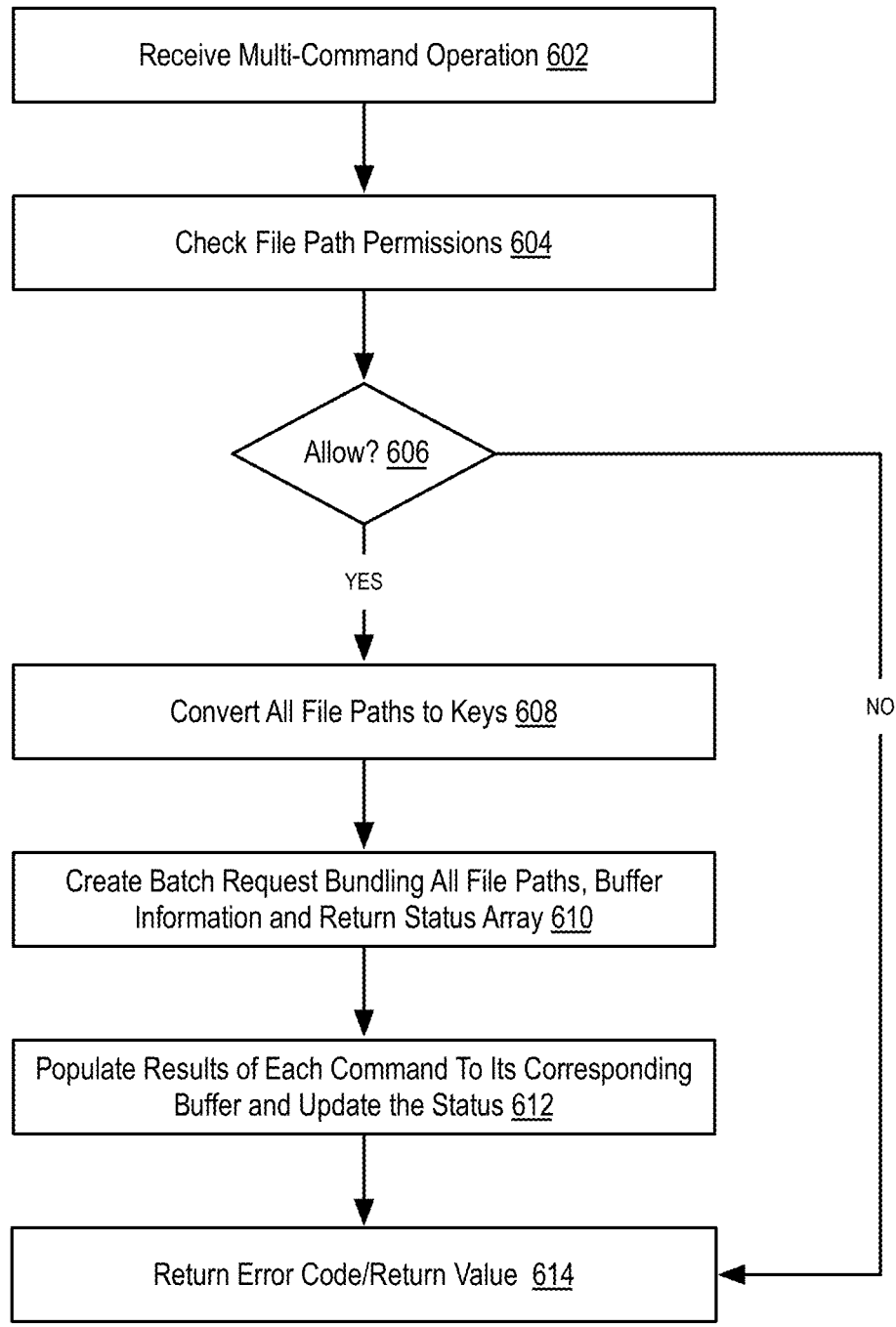
FIG. 6 is a flow diagram illustrating a method for performing a multi-command operation on a key-value filesystem according to some embodiments of the disclosure.
Figure 7:
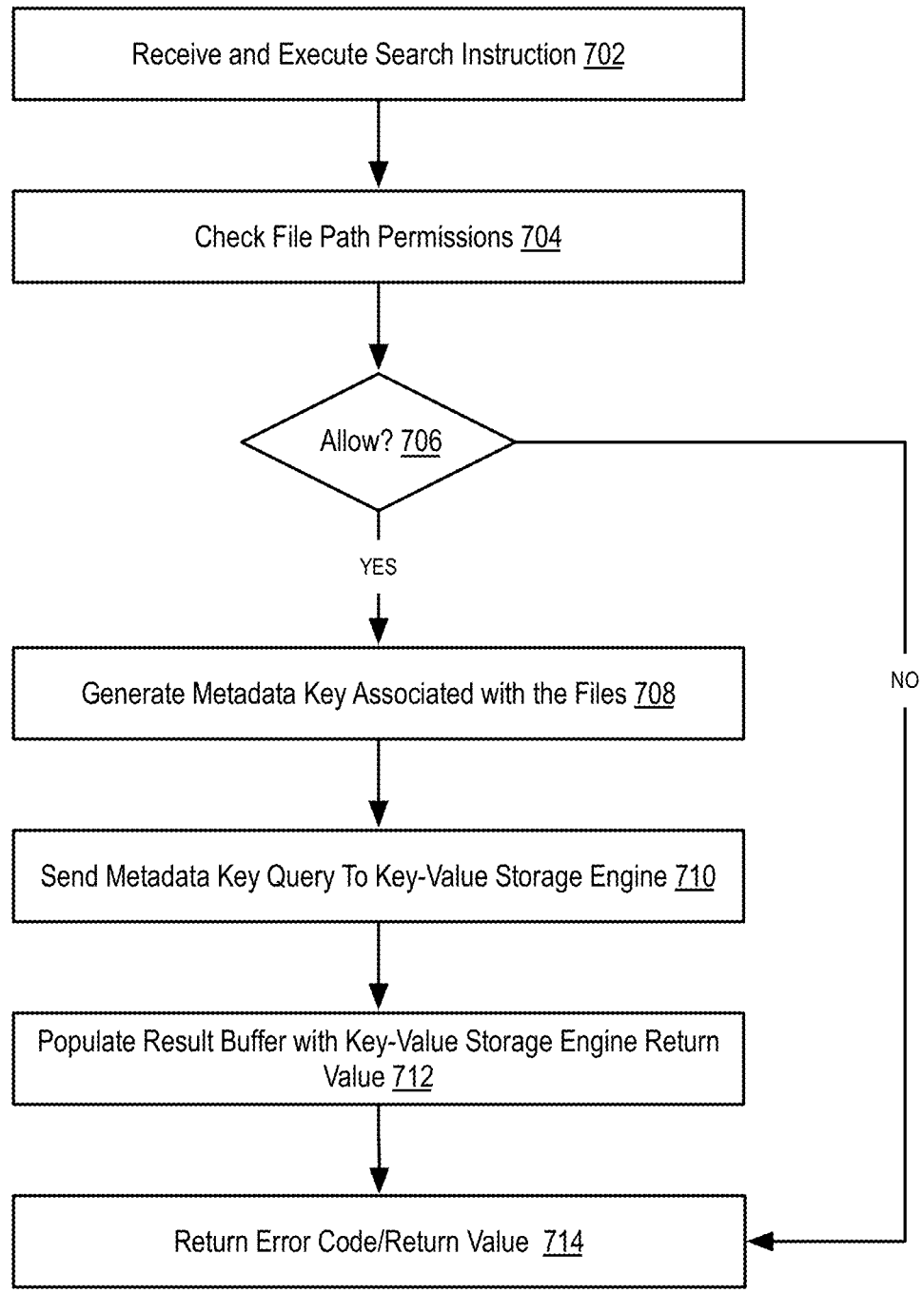
FIG. 7 is a flow diagram illustrating a method for performing a search operation on a key-value filesystem according to some embodiments of the disclosure.

In some embodiments, a file operation may include multiple file paths in the case where the file operation modifies or accesses multiple files (as described further herein, e.g. with respect to FIGS. 5 through 7). In these embodiments, the method checks permissions for each file path included in the file operation. In some embodiments, the file operation may include multiple sub-operations. In these embodiments, the method checks permissions for each file path in each sub-operation. As indicated above, checking permission may entail checking user permissions as well as group and global permissions.

In step 306, the method determines if the file operation is allowed.

In the event that the file operation includes a single operation and the operation includes a single file path. The method allows the operation if the user issuing the operation is allowed to access the file. In some embodiments, allowing the user to access a file may include allowing user full access to the file or allowing only a subset of access permissions to the user depending on the permissions of the file. If the user is not allowed to access the file, the method ends. In some embodiments, ending the method may include returning an error code to the user indicating the operation was not allowed. In some embodiments where multiple file paths are analyzed, the method may continue to allow an operation only on those file paths that the user has access to.

As discussed above, this process may be repeated for each operation and each file in each operation. In some embodiments, the method may disallow all sub-operations included within an operation if one of the sub-operations is not allowed. Alternatively, the method may proceed in allowing a subset of the sub-operations based on determining which sub-operations are allowed. For example, if the operation includes multiple, non-atomic read sub-operations and one of those requests is not allowed, the method may execute the allowed sub-operations and reject the disallowed operation, rather than disallowing all sub-operations.

In step 308, the method converts the file paths to keys.

After identifying all file paths involved in the file operation (including sub-operations), the method converts the file paths to keys for accessing a key-value store. The process of converting file paths to keys is described more fully in connection with FIG. 2, the disclosure of which is incorporated herein by reference in its entirety.

In some embodiments, if the file operation(s) are allowed, the method generates key for each portion of the file path. For example, if the operation is a write operation for the file "/dir/file.txt", the method may generate keys for "/dir" and for "/dir/file.txt". The associated value for the "/dir" key comprises a listing of files and directories located under the "/dir" path. Additionally, the method may store access permissions for the key "/dir" as well as other metadata retrieved from the underlying filesystem associated with the directory. Similar operations may be performed with respect to the key "/dir/file.txt".

In some embodiments, generating a key may comprise determining an absolute path for a relative file path. In some embodiments, generating a key may comprise converting a file descriptor to a file path. In general, the mapping between file paths and keys does not include significant processing (e.g., hash computations etc.) but rather simply includes the file path as the key. In many calls (e.g., open( )), the file path is known and thus generating a key may comprise simply using the file path as the key. However, in other system calls, a file descriptor may be given, thus the method must look up the file descriptor to obtain a path. Notably, however, this is an O(1) operation as compared to the complexity of existing systems.

In step 310, the method generates one or more key-value operations.

In one embodiment, a key-value operation corresponds to an operation that can be performed on a key-value data store. Example of such operations are GET, PUT, DELETE, APPEND, and similar operations. In general, a key-value operation requires a key to identify the affected value and includes optional data needed for the operation. For example, a GET operation may only require a key and may return the value associated with the key. In contrast, a PUT operation may require a key and a value to associate with the key. The number of key-value operations supported by key-value storage engine necessarily depends on the key-value storage engine used and the disclosure is not intended to be limited to a specific set of operations. Specific key-value operations discussed herein are merely exemplary.

In one embodiment, the method may generate a single key-value operation. In alternative embodiments, the method may generate multiple key-value operations. For example, the file operation received in step 302 may comprise a transaction which includes multiple file operations (as discussed in more detail in connection with FIG. 5). In this example, the method generates multiple key-value operations in order to perform the underlying file operation. For example, if the transaction includes a file operation to atomically open a file and write to the file, the method may generate a GET operation (using the file path) and a PUT operation (using the key returned from the GET operation and the data associated with the write file operation). The disclosed embodiments place no limitation on the number of combination of key-value operations that may be generated to implement the received file operation(s).

In step 312, the method executes the key-value operations.

As described previously, key-value operations may be executed at a key-value storage engine. In some embodiments, the method may submit the generated key-value operations to a key-value storage engine via an API provided by the key-value storage engine. That is, the method may issue the operations via one or more function calls provided to access the key-value storage engine. Alternatively, or in conjunction with the foregoing, the method may issue the file operations over a network connection (e.g., to a remotely located key-value storage engine). In some embodiments, the network connection comprises a wired or wireless wide or local area network connection. In alternative embodiments, the network connection may comprise an internal network connection within a device (e.g., in the scenario where a key-value storage engine is accessible via a specific port on a client device and accepts commands via a network interface).

In some embodiments, the method may execute the key-value operations sequentially. In alternative embodiments, the method may execute the key-value operations in parallel.

In some embodiments, the method may generate a transaction that bundles one or more key-value operations and may transmit the transaction to the key-value storage engine.

In step 314, the method returns an error value or result value.

After executing the key-value operations, the key-value storage engine returns a result value or an error code depending on the results of the operations. For example, in response to a GET operation, the key-value storage engine returns the value associated with the key as a return value or, and error message, if the key is not found (i.e., the file or directory does not exist).

In some embodiments, the method may convert the return value of the key-value storage engine into an appropriate return value for the underlying file operation. For example, while in response to a PUT request, the key-value storage engine may return the value stored to the key-value storage engine. In response, the method may return the number of bytes stored in the value corresponding key (i.e., a value corresponding to a POSIX-compliant return value of a write system call). Similarly, the method may return a POSIX-compliance error code rather than a more descriptive error returned by the key-value storage engine.

In some embodiments, the error or return values may be generated based on the type of system call. As discussed above, the method may translate error/return values into POSIX-compliant return values for all POSIX system calls. Alternatively, for non-POSIX calls the method may return more descriptive error/return values as defined by an external-facing API.

In some embodiments, the method illustrated in FIG. 3 may be executed in response to a system call issued by an application. Alternatively, or in conjunction with the foregoing, the method may execute the method illustrated in FIG. 3 in response to mounting a key-value filesystem. That is, the method may analyze an underlying filesystem and populate a key-value storage engine with data regarding the existing filesystem.

Figure 4:
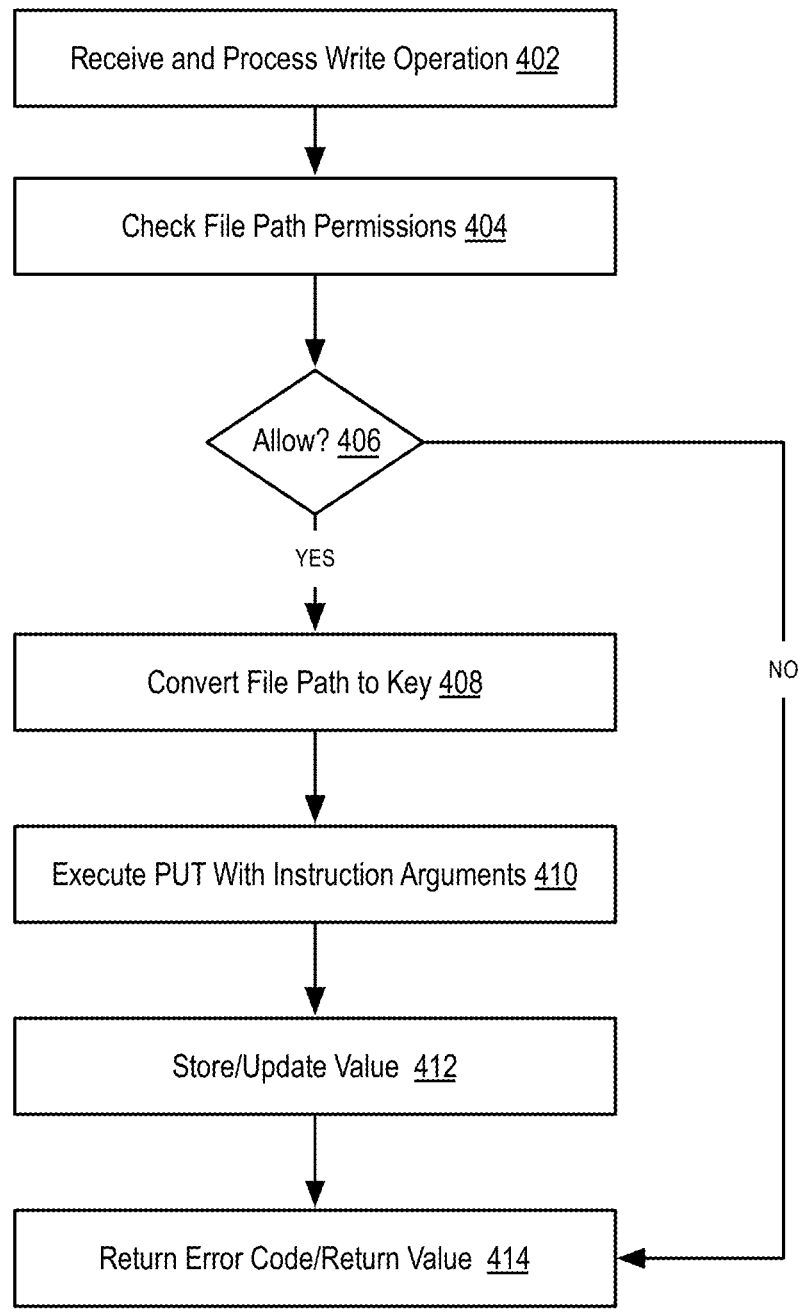
FIG. 4 is a flow diagram illustrating a method for performing a write operation on a key-value filesystem according to some embodiments of the disclosure.

FIG. 4 is a flow diagram illustrating a method for performing a write operation on a key-value filesystem according to some embodiments of the disclosure.

In step 402, the method receives and processes a write operation.

In one embodiment, a write operation refers to an instruction directing a computing device to write a file. In one embodiment, the write operation includes a file path, an offset in which to begin a write operation, a buffer containing a number of bytes to write, and a length specifying the number of bytes of the buffer to write.

In one embodiment, the method in step 402 writes the file to disk. In some embodiments, the method may employ system calls of an underlying non-KV filesystem to write the file to disk. For example, the method may write the file to an existing ext4 underlying filesystem via a system call library such as glibc. In this manner, the method transparently writes files to a traditional hierarchal filesystem, while maintaining a separate KV-based implementation of the underlying filesystem.

In step 404 and step 406, the method checks file path permissions associated with the file path and determines if a key-value operation is allowed for the file path, respectively. The steps of checking file path permission and allowing or disallowing key-value operations is described more fully in connection with FIG. 3 (and, specifically, steps 304 and 306), the disclosure of which is not repeated herein but is incorporated by reference in its entirety. As illustrated, if the write operation is not allowed, the method may return an error code indicating that the issued write operation was not allowed due to insufficient privileges of the issuing process/user.

In step 408, the method converts the file path to a key.

As described previously, the underlying key-value storage engine stores the path of files and directories as keys in the key-value storage engine. Thus, in order to access the corresponding value of the file path, the method converts the file path to a key as described more fully in connection with FIGS. 2A-2B and FIG. 3 (specifically, step 308), the disclosure of all incorporated herein by reference in its entirety.

In step 410, the method executes a PUT instruction with the instruction arguments.

In one embodiment, the PUT instruction may take a variety of options, as defined by the underlying key-value storage engine. For example, the PUT instruction generally requires a key and a value and a set of options. In some embodiments, these options may be specific to the key-value storage engine and may define how the PUT operation operates. For example, the options may define operational settings of the key-value storage engine such as a compression type, write buffer settings, rate limits, checksum verification options, compaction options, logging options, and various other settings used to configure the underlying key-value storage engine. In some embodiments, the options may be configured on a per-operation basis (e.g., write buffer settings) while alternative, or in conjunction, the options may include global options (e.g., logging options).

In the illustrated embodiment, the PUT instruction may be issued by the method via an API call provided by an underlying key-value storage engine. In other embodiments, the PUT instruction may be transmitted over a network to a remote key-value storage engine. In this embodiment, the method provides remote redundancy by writing the file to a local disk using a standard filesystem while mirroring a copy of the file in a key-value storage engine in a remote location. Alternatively, the PUT instruction may be transmitted to a local application via a network port.

In step 412, the method stores or updates the value.

After issuing a PUT request to a key-value storage engine, the key-value storage engine persistently saves the data associated with the file path into the key-value storage engine. As discussed above, the data includes the contents of the file and metadata regarding the file. As part of the PUT instruction, the method may save various metadata regarding the file as the value associated with the key (as discussed in connection with FIG. 2). Further, the method may index the metadata associated with the file for subsequent use.

If the file does not exist, the method may store the value (e.g., as a new file write). Alternatively, if the file exists, the method may update the value based on parameters of the instruction. For example, the method may append data to the value associated with the file path (key). Alternatively, the method may truncate the value and overwrite the value if the instructions indicate that truncation is required.

In step 414, the method returns an error value or return value. The process of returning an error/return value is described in connection with FIG. 3 (specifically, step 314), the disclosure of which is incorporated herein by reference in its entirety. With respect to a write operation, the method may return the number of bytes stored in the value associated with key as the return value and may return an integer status code upon encountering an error associated with the write operation.

FIG. 5 is a flow diagram illustrating a method for performing a transactional operation on a key-value filesystem according to some embodiments of the disclosure.

In step 502, the method receives and processes a transaction operation.

In one embodiment, a transaction operation includes an array of operations to be performed, a file array, a buffer array, and an atomic flag. The array of operations includes a listing of file operations (e.g., read, delete, write, etc.). The file array includes a list of files corresponding to the operations. The buffer array comprises an empty array for storing the results of the corresponding operations. The atomic flag comprises a Boolean flag which indicates whether the transaction should be executed atomically or not. As an example, the transaction operation may take the form of the pseudo-code instruction: transaction ([:read, :delete], [:filepath1, :filepath2], new Array(2), TRUE).

This instruction indicates that the transaction reads filepath1 and then deletes filepath2. The atomic flag indicates that the file operation must be performed atomically. In alternative embodiments, the operation array may additionally include options or arguments for the operations. For example, a write operation may include the data to be written as an argument of the write operation.

Upon receiving the transaction operation, the method may then generate a plurality of system calls to execute the desired operations at the underlying hierarchal filesystem. Continuing the previous example, the method may issue a read(3) system call followed by a remove(3) system call (or, alternatively, an unlink(2) or rmdir(2) system call).

In some embodiments, the method may analyze the operation array and file array to determine an order of execution of the commands. In this embodiment, the method may attempt to reorder commands in order to avoid errors in processing the transaction. For example, if the operations include "read file 1", "delete file 2", "read file 2", the method may reorder these operations to avoid reading file 2 after deleting the file. Thus, the operations may be reordered as "read file 1", "read file 2", and "delete file 2." In alternative embodiments, the method may simply exit with an error code if an invalid transaction is identifies. Alternatively, the method may simply execute the transactions as supplied in the instruction and populate the result buffer with the status code or error codes of each transaction. In this embodiment, the method parlays error handling and management to the calling application.

In step 504 and step 506, the method checks file path permissions associated with each file path and determines if the transaction operation is allowed for each file path, respectively. The steps of checking file path permission and allowing or disallowing key-value operations is described more fully in connection with FIG. 3 (and, specifically, steps 304 and 306), the disclosure of which is not repeated herein but is incorporated by reference in its entirety. In contrast to FIG. 4, the method in FIG. 5 checks the file path permissions for each file included in the transaction operation.

In step 508, the method converts all file paths in the transaction operation to keys.

As described previously, the underlying key-value storage engine stores the path of files and directories as keys in the key-value storage engine. Thus, in order to access the corresponding value of the file path, the method converts the file path to a key as described more fully in connection with FIGS. 2A-2B and FIG. 3 (specifically, step 308), the disclosure of all incorporated herein by reference in its entirety. In the illustrated embodiment, the method extracts each file path from the file array and converts each file path into a key.

In step 510, the method creates a transaction request bundling all mutations.

In one embodiment, creating a transaction request comprises first generating a transaction according to the underlying key-value storage engine transaction API. For example, the method may initiate a transaction using a BEGIN TRANSACTION command or equivalent comment. In some embodiments, the BEGIN TRANSACTION command may be configured with options defining the write and transaction characteristics of the transaction as discussed previously.

Next, the method may generate a series of key-value operations based on the operation array and the keys. The method may generate the operations by analyzing the operation array and translating the file operations to key-value operations. Continuing the previous example, the method may convert the read(3) and delete(3) operations to PUT and DELETE operations for the key-value storage engine. Thus, at the end of step 510, the method creates a transaction with a BEGIN TRANSACTION command and generates a series of key-value operations corresponding to the requested file operations.

In step 512, the method executes the transaction at the key-value storage engine.

After executing the BEGIN TRANSACTION operation, the method proceeds to issue each key-value operation to the key-value storage engine. Issuing the key-value operation may be undertaken in the manners discussed in connection with step 410 of FIG. 4 and step 312 of FIG. 3, the disclosure of which is incorporated herein by reference in its entirety.

With respect to the execution in step 512, the method may additionally undertake additional steps to handle the transactional nature of the instruction. In one embodiment, the method may sequentially execute the individual key-value operations until encountering an error. Upon encountering an error, the method may rollback the executed instructions using a ROLLBACK command, thus undoing the changes. Upon detecting a ROLLBACK condition, the method may then proceeding rolling back the underlying filesystem operations.

Considering the previous example of a "delete file2" command being rolled back, due to the use of the underlying key-value storage engine, the value of file2 is stored concurrently in the key-value storage engine, thus the method is able to "restore" file2 in the underlying filesystem based on the value stored in the key-value storage engine. Thus, when rolling back a delete instruction, the method may extract the value of the deleted file from the key-value storage engine and issue a write system call to replace the file that was deleted in step 502.

Notably, executing the key-value operation at a key-value storage engine as a batch transaction comprises executing either all of the key-value operations or none of the key-value operations as discussed in detail above.

In step 514, the method returns an error value or return value.

The process of returning an error/return value is described in connection with FIG. 3 (specifically, step 314), the disclosure of which is incorporated herein by reference in its entirety.

With respect to a transaction operation, each key-value operation returns a result which may be stored within the result buffer of the transaction operation. Thus, the result buffer will store a return value or error code (discussed previously) for each instruction.

The above method may be implemented as an API call from a KVFS library or kernel module as discussed previously.

FIG. 6 is a flow diagram illustrating a method for performing a multi-command operation on a key-value filesystem according to some embodiments of the disclosure.

In step 602, the method receives a multi-command operation.

In one embodiment, a multi-command operation includes a file array, a buffer array, and a result array. A file array, as described previously, includes a list of files to be operated upon and a buffer array comprises an empty buffer for storing the results of the file operations.

In one embodiment, the multi-command operation comprises a multi-read operation. A multi-read operation refers to an operation that reads multiple files as a batch transaction. In this embodiment, the file array may additionally include an offset for each file and a length of bytes to read from each file. The result array stores an error code or return status of each of the file reads (e.g., the file contents of each read or a number of bytes read).

In another embodiment, the multi-command operation comprises a multi-write operation. A multi-write operation refers to an operation that writes multiple files as a batch transaction. In this embodiment, the file array may additionally include an offset in which to begin a write operation, a buffer containing a number of bytes to write, and a length specifying the number of bytes of the buffer to write. In this embodiment, the result array may store the number of bytes written for each of the file writes, an error code, and/or the contents of the file write operation.

While described primarily in the context of reading or writing file contents, the multi-command operation may additionally take the form of a directory lookup (i.e., listing the files and directories in a directory), a file/directory attribute lookup, or other operations executable with respect to directories and files. Notably, the multi-command instruction may be structured for any underlying file operation. For example, the multi-command instruction may be structured for any POSIX-compliant file operations or any non-POSIX file operations supported via an API (discussed herein). Thus, the method illustrated in FIG. 6 may be applied equally to delete, rename, or any other file-based operation. In general, the file array received as part of the multi-command will comprise a number of files and the corresponding arguments for the underlying system call (e.g., delete, rename, etc.) and the result array stores the return values expected of those individual calls or error codes, as appropriate. The following description of FIG. 6 describes the operation of multi-read and multi-write operations but the disclosure is not intended to be limited to only those instructions as discussed above.

In step 604 and step 606, the method checks file path permissions associated with each file path and determines if the multi-command operation is allowed for each file path, respectively. The steps of checking file path permission and allowing or disallowing key-value operations is described more fully in connection with FIG. 3 (and, specifically, steps 304 and 306), the disclosure of which is not repeated herein but is incorporated by reference in its entirety. Similar to FIG. 5, the method in FIG. 6 checks file path permissions for each file included in the multi-command operation.

In step 608, the method converts the file paths to corresponding keys.

As described previously, the underlying key-value storage engine stores the path of files and directories as keys in the key-value storage engine. Thus, in order to access the corresponding value of the file path, the method converts the file path to a key as described more fully in connection with FIGS. 2A-2B and FIG. 3 (specifically, step 308), the disclosure of all incorporated herein by reference in its entirety. In the illustrated embodiment, the method extracts each file path from the file array and converts each file path into a key.

In step 610, the method creates a batch request bundling all file paths, buffer information, and a return status array.

In one embodiment, the method may first identify the appropriate key-value operation corresponding to the file operations included in the multi-command operation (e.g., GET operations for read operations and PUT operations for write operations). In one embodiment, the batch request may correspond to a transaction supported by the key-value storage engine. For example, the method may generate a transaction with a BEGIN TRANSACTION command and generate a GET operation (in the context of a multi-read operation) or a PUT operation (in the context of a multi-write operation) for each key identified in step 608. Finally, the method issued a COMMIT command to execute the transaction.

In some embodiments, the key-value storage engine may natively support multiple reads, writes, or other operations. In this scenario, the method may simply issue the native command to the key-value storage engine with the list of keys generated in step 608. In this embodiment, the method issues the native command including the keys and receives an array of values from the key-value storage engine. For example, the REDIS database includes the command MGET which takes, as arguments, a list of keys and returns an array of read values, or nil if the key is not found. Similarly, for a multi-write operation, the REDIS database includes the command MSET which takes, as arguments, a list of keys and values and returns a status indicator (e.g., "OK") to indicate success of the write operations.

In step 612, the method populates the results of each command to a corresponding buffer and updates the status array.

As discussed above, with respect to a multi-read operation, each GET operation returns either a value (e.g., the contents of a file or attributes of directory/file, etc.). In step 612, the method populates the result array with the return value of the GET operations for each file path. Thus, the result array comprises an array of return values (e.g., file contents, attributes, directory lookups, etc.) as well as potentially null values for any keys that do not have a corresponding value (e.g., nonexistent files/directories).

Similarly, with respect to a multi-write operation, each PUT operation returns either a value (e.g., the number of bytes written or the value written). In step 612, the method populates the result array with the return value of the PUT operations for each file path. Thus, the result array comprises an array of return values (e.g., bytes written, file contents, etc.) as well as potentially null values for any keys that could not be written.

In one embodiment, the method may further modify the result values based on the original command. For example, the method may truncate the result value if the underlying command specifies a length parameter shorter than the length of the return value for a given key. Likewise the method may remove a prefix of the returned bytes based on the value of an offset parameter of a given read instruction.

The method further updates a status array based on the results of the underlying multi-command operation. Thus, if a valid value is returned for a given key and operation (e.g., read, write, etc.), the method may update a return value of "0" indicating a successful operation or may set the return value as the number of bytes read (or other value depending on the specific underlying operation, such as the file contents of a GET operation). Alternatively, if a value does not correspond to the key or an error otherwise occurs, the method may set a non-zero status code indicating an error had occurred.

In step 614, the method returns an error value or return value. The process of returning an error/return value is described in connection with FIG. 3 (specifically, step 314), the disclosure of which is incorporated herein by reference in its entirety. With respect to a multi-command operation, the method may return the number of bytes stored in the result array associated as both the return values and error codes of the multi-command operation. As discussed above, the specific data returned in step 614 depends on the underlying system call and key-value operation.

FIG. 7 is a flow diagram illustrating a method for performing a search operation on a key-value filesystem according to some embodiments of the disclosure.

In step 702, the method receives and executes a search operation.

In one embodiment, the search operation may include a list of directories to query, a list of file attributes to use as a query condition, and a query result buffer to store the filenames of matching files. The list of directories may comprise a listing of file paths corresponding to locations in the underlying filesystem to search for files. The file attributes may comprise various metadata regarding the query parameters such as filename, size, extension, etc. In one embodiment, the list of file attributes may include an attribute and a corresponding condition value. For example, a file attribute may comprise the size of a file and a range (e.g., greater than 30 MB) to use as the query condition for the file attribute.

In some embodiments, the search operation may further include a timeout parameter which specifies a length of time (e.g., in milliseconds) to spend performing the search. In this embodiment, the method may proceed in searching the key-value storage engine until the timeout has been reached and at that point may return the results of the search at that time (i.e., abbreviating a full search).

In step 704 and step 706, the method checks file path permissions associated with the file paths and determines if a key-value operation is allowed for each file path, respectively. The steps of checking file path permission and allowing or disallowing key-value operations is described more fully in connection with FIG. 3 (and, specifically, steps 304 and 306), the disclosure of which is not repeated herein but is incorporated by reference in its entirety.

In step 708, the method generates a metadata key associated with the files identified in step 702.

In one embodiment, the key-value storage engine stores key-value pairs representing file metadata and/or access permissions. In one embodiment, the method may store, as a value, the file attributes of a file or directory. As part of this process, the method may utilize a separate index to index attribute data of the files/directory. For example, the file size of a file may be indexed in the key-value storage engine to provide faster lookups based on a given file size, or a file size range.

Once the method identifies all relevant files in the query directories in step 702, the method utilizes the file attributes to generate a final metadata key. A given metadata key may thus include a list of potential file matches and a set of query conditions. For example, if a user is looking for files in directory "/dir" (which includes files "file1" and "file2") that exceed 30 MB, the metadata key may specify these filenames and a condition of "$size: {$gt: "30 MB"}" where "$gt" is an operator indicating a range. Thus, a final metadata key may be formed as {filepath: ["/dir/file1", "/dir/file2"], $size: {$gt: "30 MB"}}. The preceding example is exemplary only and not intended to limit the number of query operators used. Other operators that may be used include any comparison operator, set operator, equality operator, or other logical operators. Further operators may be combined or chained as needed to generate query conditions of arbitrary complexity. It should be noted that the file path listing and the query conditions are generally mutually exclusive. That is, the listing of files provided in the query do not all necessarily meet the query conditions, rather they are utilized to further refine the scope of the query.

In addition to conditional operators, the metadata key may further include ordering operators or aggregation operators. For example, the previous example may also use a "$sort" key in addition to the "$size" key, wherein the sort key selects a file attribute to sort on. Since the details regarding files are stored in a key-value storage engine, sorting operations may be implemented in an ad hoc nature on any field (e.g., file attribute).

In step 710, the method sends the metadata key query to the key-value storage engine.

In one embodiment, sending a metadata key may comprise transmitting the generated key to the key-value storage engine via an API call, network request, or local network request as described above. In some embodiments, the key-value storage engine may define specific commands for issuing metadata queries. For instance, the key-value storage engine may define an indexed search operator that allows for queries based on the values stored within the key-value storage engine.

In step 712, the method populates a result buffer with the key-value storage engine return value.

In one embodiment, the result buffer comprises a fixed or dynamic allocation of memory for storing the results of the key-value storage engine query. In one embodiment, the result of the key-value storage engine query comprises a listing of file paths. In this embodiment, the method populates the result buffer with the file paths.

In step 714, the method returns an error value or return value. The process of returning an error/return value is described in connection with FIG. 3 (specifically, step 314), the disclosure of which is incorporated herein by reference in its entirety. With respect to a search operation, the method may return the result buffer as the return value.

Figure 8:
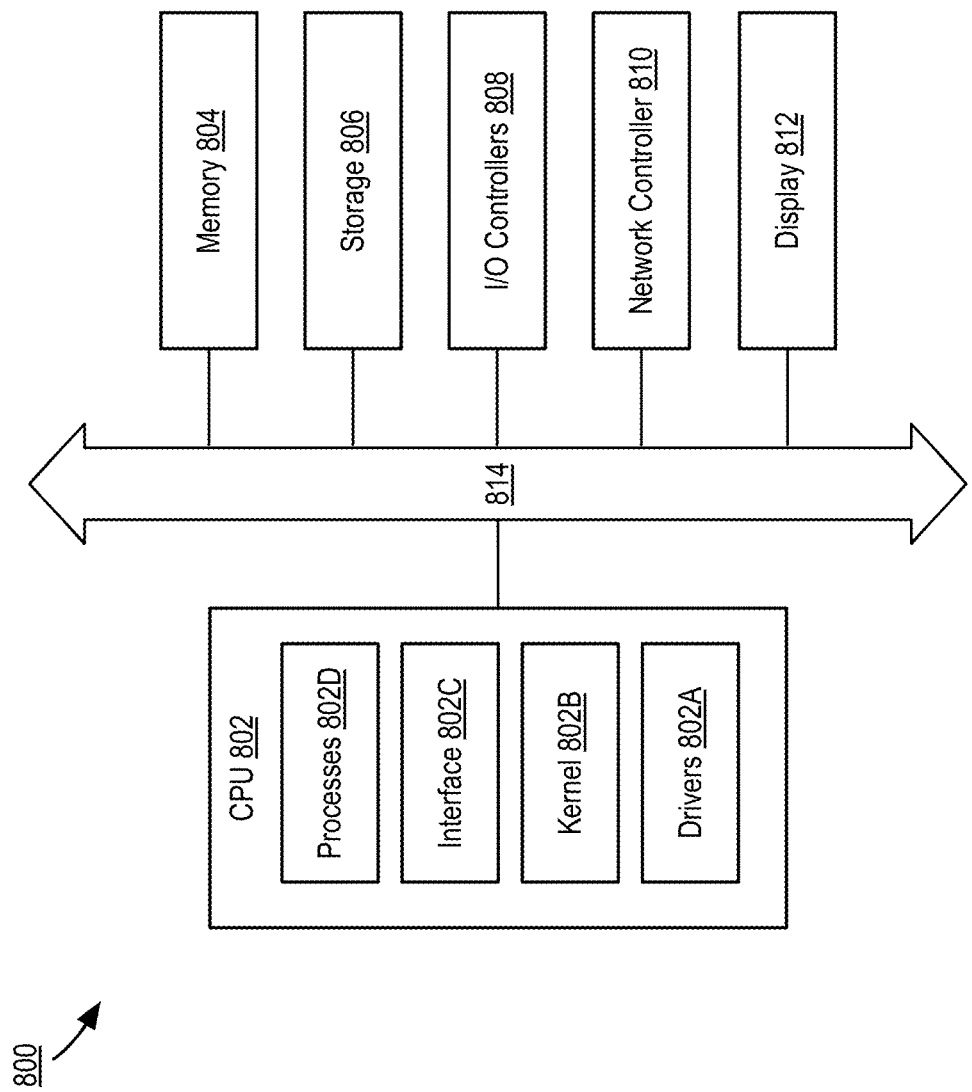
FIG. 8 is a hardware diagram illustrating a device for providing a key-value filesystem according to some embodiments of the disclosure.

FIG. 8 is a hardware diagram illustrating an example of a hardware device for providing a key-value filesystem according to some embodiments of the disclosure.

As illustrated in FIG. 8, a device 800 includes a CPU 802 that includes processes 802D, an interface 802C, a kernel 802B, and drivers 802A. CPU 802 may comprise an application-specific processor, a system-on-a-chip, a field programmable gate array (FPGA), a microcontroller or any suitable processing device.

CPU 802 runs multiple processes 802D at any given time. Processes 802D correspond to user space processes executed by the device 800. In the illustrated embodiment, the processes 802D correspond to the applications discussed in connection with FIG. 1, the disclosure of which is incorporated herein by reference in its entirety. Applications corresponding to processes 802D may be stored in memory 804 and may be loaded by CPU 802 via bus 814. Memory 804 includes RAM, ROM, and other storage means. Memory 804 illustrates another example of computer storage media for storage of information such as computer readable instructions, data structures, program modules or other data. Memory 804 stores a basic input/output system ("BIOS")

for controlling low-level operation of the device 800. The mass memory also stores an operating system (comprising interface 802C, kernel 802B, and drivers 802A) for controlling the operation of the device 800. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Processes 802D interact with kernel 802B, drivers 802A, and ultimately peripherals 806, 808, 810, and 812 via interface 802C. In one embodiment, interface 802C comprises a system call interface as described previously (e.g., glibc).

Processes 802D issue system calls (e.g., file operations) through interface 802C to kernel 802B which controls peripherals 806, 808, 810, 812, 814, and 816 via one or more device drivers 802A. In the illustrated embodiment, the interface 802C, kernel 802B, and drivers 802A are configured to provide access to filesystems stored in storage 806 as described in more detail in connection with FIG. 1, the disclosure of which is incorporated herein by reference in its entirety.

Storage 806 comprises a non-volatile storage medium. Storage 806 may store both inactive applications as well as user data. Data stored storage 806 corresponds to raw data utilized by one or more filesystems loaded into kernel 802B. In some embodiments, storage 806 may comprise disk-based storage media, Flash storage media, or other types of permanent, non-volatile storage media.

Device 800 additionally includes I/O controllers 808. I/O controllers 808 provide low level access to various input/output devices such as mice, keyboards, touchscreens, etc. as well as connective interfaces such as USB, Bluetooth, infrared and similar connective interfaces.

Device 800 additionally includes network controllers 810. Network controllers 810 include circuitry for coupling device 800 to one or more networks, and are constructed for use with one or more communication protocols and technologies. Network controllers 810 are sometimes known as transceivers, transceiving devices, or network interface cards (NIC).

Device 800 additionally includes a display 812. Display 812 may be a liquid crystal display (LCD), gas plasma, light emitting diode (LED), or any other type of display used with a computing device. Display 812 may also include a touch sensitive screen arranged to receive input from an object such as a stylus or a digit from a human hand.

Note that the listing of components of device 800 is merely exemplary and other components may be present within device 800 including audio interfaces, keypads, illuminators, power supplies, and other components not explicitly illustrated.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
receiving a transaction operation from an application, the transaction operation including an array of file paths, an array of file operations, and a buffer array, wherein each file operation in the array of file operations is associated with at least one corresponding file path in the array of file paths, and the buffer array comprises an empty array for storing results of corresponding file operations in the array of file operations;
converting all file paths in the array of file paths included in the transaction operation into keys;
converting the transaction operation into a transaction request for a key-value storage engine according to the following steps:
generating a transaction according to an application programming interface (API) of the key-value storage engine,
generating key-value operations based on the array of file operations included in the transaction operation and the keys converted from all file paths in the array of file paths included in the transaction operation, wherein the generating key-value operations comprises translating each file operation in the array of file operations to a corresponding key-value operation, and at least one of the key-value operations references a key included in the keys, and bundling the transaction and the key-value operations in the transaction request;
executing the transaction request at the key-value storage engine;
receiving, from the key-value storage engine, a result for each of the key-value operations;
generating a result value based on the result for each of the key-value operations; and
returning the result value for each of the key-value operations to the application by inserting the result value into the buffer array.

2. The method of claim 1 wherein the key-value operations comprise a write command including a number of bytes to write, and wherein translating each file operation in the array of file operations to a corresponding key-value operation further comprises generating a PUT request using a file path as a key and the number of bytes as a value.

3. The method of claim 1, further comprising rolling back the key-value operations upon detecting an error in executing one of the key-value operations.

4. The method of claim 1, wherein the key-value operations comprise a multi-command operation including an array of file paths and wherein translating each file operation in the array of file operations to a corresponding key-value operation further comprises generating a plurality of key-value instructions for each of the file paths in the array of file paths, the plurality of key-value instructions generated based on the type of the multi-command operation.

5. The method of claim 1 wherein the key-value operations comprise a search command, the search command including a list of directories, a list of file attributes, and a query result buffer, and wherein the method further comprises:
identifying a plurality of file paths responsive to the list of directories; and
generating a metadata key based on the plurality of file paths and the list of file attributes.

6. The method of claim 1, wherein prior to translating each file operation in the array of file operations to a corresponding key-value operation, the method further comprises verifying that the application has permission to access a file identified by a file path.

7. The method of claim 1, further comprising performing a filesystem operation on a file represented by a file path based on a file operation, wherein performing a filesystem operation based on the file operation comprises issuing a system call to an underlying hierarchal filesystem.

8. A device comprising:
a processor; and
a non-transitory memory storing computer-executable instructions therein that, when executed by the processor, cause the device to:
receive a transaction operation from an application, the transaction operation including an array of file paths, an array of file operations, and a buffer array, wherein each file operation in the array of file operations is associated with at least one corresponding file path in the array of file paths, and the buffer array comprises an empty array for storing results of corresponding file operations in the array of file operations;
convert all file paths in the array of file paths included in the transaction operation into keys;
convert the transaction operation into a transaction request for a key-value storage engine according to the following steps:
generate a transaction according to an application programming interface (API) of the key-value storage engine, generate key-value operations based on the array of file operations included in the transaction operation and the keys converted from all file paths in the array of file paths included in the transaction operation, wherein the generating key-value operations comprises translating each file operation in the array of file operations to a corresponding key-value operation, and at least one of the key-value operations references a key included in the keys, and bundle the transaction and the key-value operations in the transaction request;
execute the transaction request at the key-value storage engine;
receive, from the key-value storage engine, a result for each of the key-value operations;
generate a result value based on the result for each of the key-value operations; and
return the result value for each of the key-value operations to the application by inserting the result value into the buffer array.

9. The device of claim 8, wherein the key-value operations comprise a write command including a number of bytes to write, and wherein translating each file operation in the array of file operations to a corresponding key-value operation further comprises generating a PUT request using a file path as a key and the number of bytes as a value.

10. The device of claim 8, wherein the computer-executable instructions further comprise instructions causing the device to roll back the key-value operations upon detecting an error in executing one of the key-value operations.

11. The device of claim 8, wherein the key-value operations comprise a multi-command operation including an array of file paths and wherein translating each file operation in the array of file operations to a corresponding key-value operation further comprises generating a plurality of key-value instructions for each of the file paths in the array of file paths, the plurality of key-value instructions generated based on the type of the multi-command operation.

12. The device of claim 8, wherein the key-value operations comprise a search command, the search command including a list of directories, a list of file attributes, and a query result buffer, and wherein the computer-executable instructions further comprise instructions causing the device to:
identify a plurality of file paths responsive to the list of directories; and
generate a metadata key based on the plurality of file paths and the list of file attributes.

13. The device of claim 8, wherein prior to translating each file operation in the array of file operations to a corresponding key-value operation, the computer-executable instructions further comprise instructions causing the device to verify that the application has permission to access a file identified by a file path.

14. The device of claim 8, wherein the instructions further cause the device to perform a filesystem operation based on a file operation, performing a filesystem operation based on the file operation comprising issuing a system call to an underlying hierarchal filesystem.

15. A system comprising:
a processor executing one or more applications;
a storage device communicatively coupled to the processor, the storage device storing a plurality of files; and a key-value filesystem module, executed by the processor, configured to:
  receive a transaction operation from an application, the transaction operation including an array of file paths, an array of file operations, and a buffer array, wherein each file operation in the array of file operations is associated with at least one corresponding file path in the array of file paths, and the buffer array comprises an empty array for storing results of corresponding file operations in the array of file operations;
  convert all file paths in the array of file paths included in the transaction operation into keys;
  convert the transaction operation into a transaction request for a key-value storage engine according to the following steps:
    generate a transaction according to an application programming interface (API) of the key-value storage engine,
    generate key-value operations based on the array of file operations included in the transaction operation and the keys converted from all file paths in the array of file paths included in the transaction operation, wherein the generating key-value operations comprises translating each file operation in the array of file operations to a corresponding key-value operation, and at least one of the key-value operations references a key included in the keys, and
    bundle the transaction and the key-value operations in the transaction request;
  execute the transaction request at the key-value storage engine;
  receive, from the key-value storage engine, a result for each of the key-value operations;
  generate a result value based on the result for each of the key-value operations; and
  return the result value for each of the key-value operations to the application by inserting the result value into the buffer array.

\* \* \* \* \*